Figure 1:
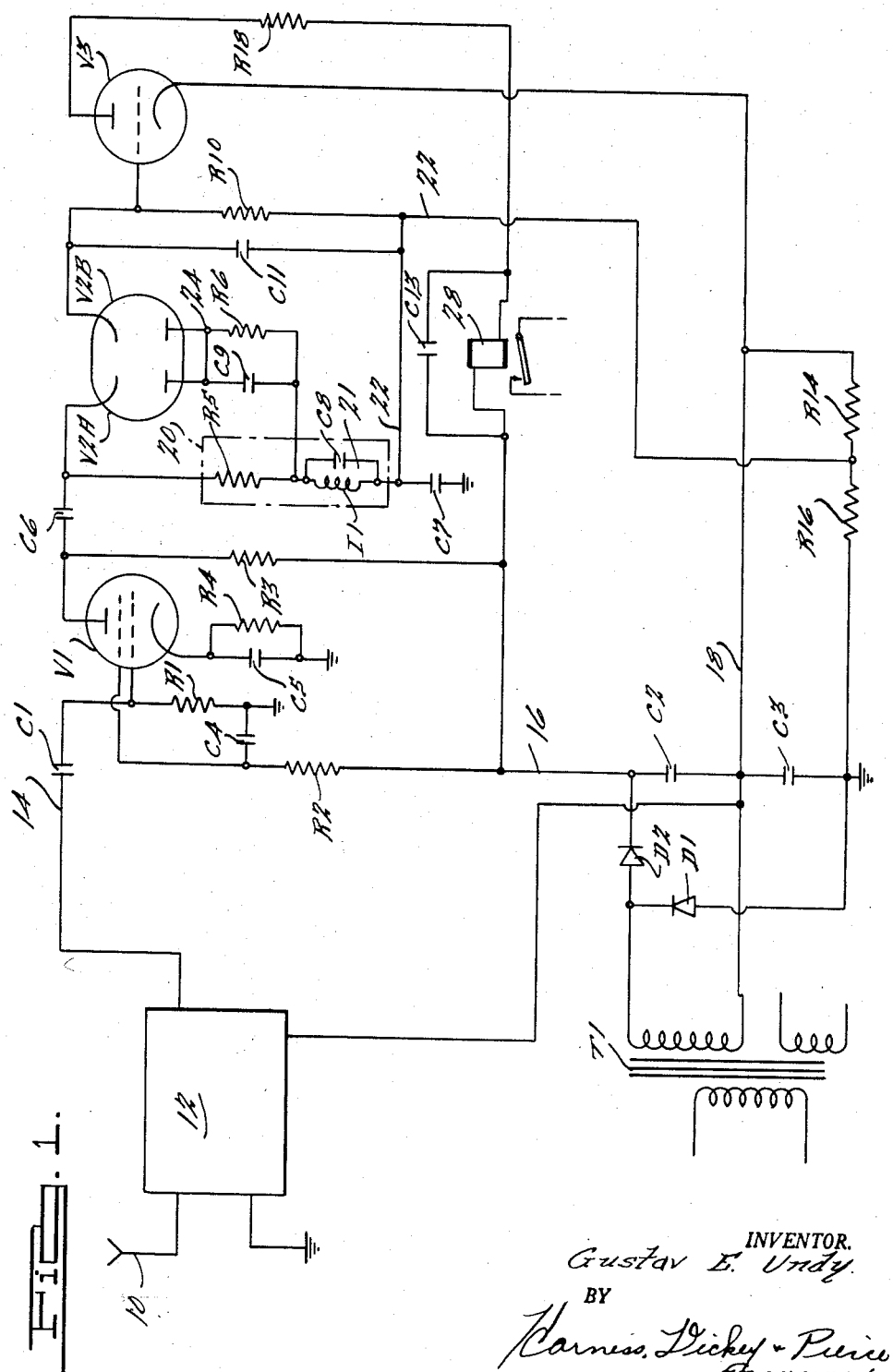

May 12, 1959

G. E. UNDY 2,886,703

SELECTIVE REMOTE CONTROL APPARATUS

Filed April 8, 1955

2 Sheets-Sheet 1

INVENTOR.
Gustav E. Undy.
BY
Harness, Dickey & Pierce.
ATTORNEYS

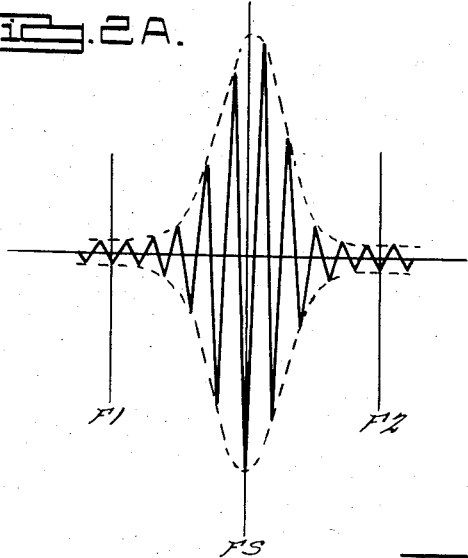
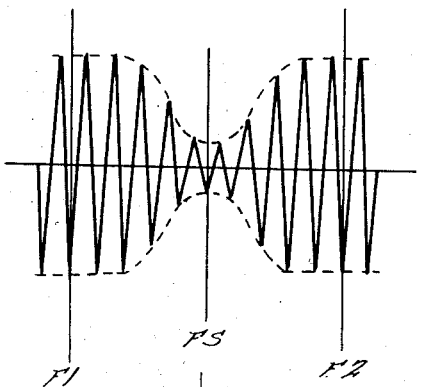
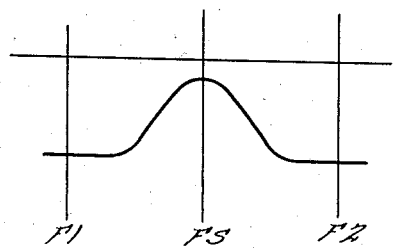
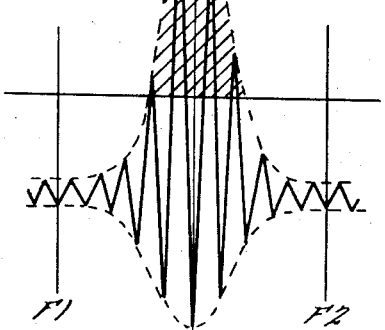
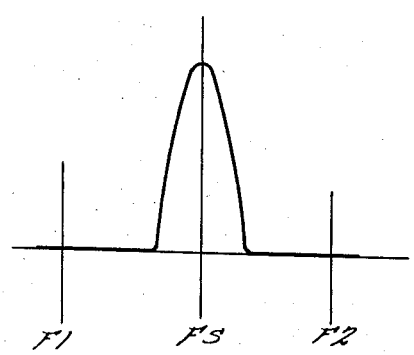
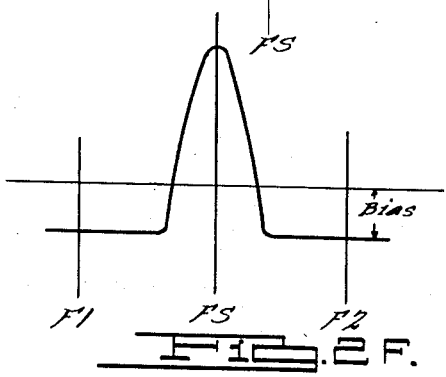

United States Patent Office 2,886,703
Patented May 12, 1959

2,886,703

SELECTIVE REMOTE CONTROL APPARATUS

Gustav E. Undy, Detroit, Mich., assignor to Multi-Products Co., Inc., Oak Park, Mich., a corporation of Michigan Application April 8, 1955, Serial No. 500,138

10 Claims. (Cl. 250—27)

This invention relates to radio controlled remotely operated apparatus, and more particularly to control apparatus operative only in response to the receipt of alternating current signals of a selected one of a plurality of frequencies.

The selective operation of one of a plurality of remotely controlled devices can be accomplished by enabling each such device to respond only to a selected one of a plurality of discrete signal frequencies. If the controlling and control devices can be interconnected by wire, the signal may be in the form of alternating voltages in, for example, the audio-frequency range. If radio control is indicated, the signals may be transmitted by an amplitude-, frequency-, or phase-modulated carrier, and demodulated at each of the receivers.

In either case, each remotely controlled device must be imbued with a frequency-sensitive characteristic so that it can produce an output indication only upon the receipt of an alternating current signal of a preselected frequency. The output indication, from the standpoint of the frequency-sensitive portion of the total equipment, is usually the attainment of a preselected, critical, output-voltage amplitude to appropriately energize, or de-energize, voltage-sensitive apparatus such as an electron-discharge device.

Since signals may be received both higher and lower in frequency than that to which the remotely controlled device is intended to be responsive, the device must be arranged to produce this output indication only at the selected frequency, i.e., the output voltage must approach a limit value (maximum or minimum, positive or negative) at the selected frequency. Further, means must be provided to render the equipment effectively insensitive to amplitude variations of the input alternating current signal if accurate results are to be obtained.

A form of frequency sensitive circuit for remote control uses is described and claimed in my copending application on Selective Control Apparatus, Serial No. 426,656, filed April 30, 1954, issued April 9, 1957 as Patent 2,788,521. Means have now been found for improving the performance and reducing the cost of construction of apparatus of the general type disclosed in that application.

The object of the invention is to reduce the cost of manufacture and maintenance and to improve the performance of remotely controlled apparatus.

A feature of this invention is a tuned means for applying to a voltage-responsive rectifying device an alternating voltage the amplitude of which approaches a limit value at a selected signal frequency, in combination with means for applying to that rectifying device a biasing direct voltage the amplitude of which varies as a function of at least the amplitude of the input signal.

The manner of attainment of the foregoing object, the nature of the foregoing feature, and other objects and features of the invention, will be perceived from the following detailed description of an embodiment of the invention when read with reference to the accompanying drawings in which:

Figure 1 is a schematic representation, partially in block schematic form, of a circuit embodying the principles of the invention; and Figs. 2A to 2F are curves representing the voltage conditions, with variations in the frequency of the input signal, existing at certain points in the circuit of Fg. 1.

The equipment embodying the principles of the invention is assumed to be designed to be responsive to a single frequency, in preferably, the audio-frequency range. If the equipment is to be remotely operated through the medium of radio waves, then the equipment must be associated with a transmitter capable of transmitting a carrier, having suitable amplitude and frequency characteristics, modulated by a signal in the audio-frequency range. Additionally, the equipment detailed in the drawings must then be associated with a suitable receiving antenna and demodulator or demodulator-amplifier, the former being represented by antenna 10 and the demodulator or demodulator-amplifier being represented by rectangle 12.

The transmitter may be of any suitable type such as that represented in Fig. 1 of the drawings of the above-identified copending application. The contents of rectangle 12 may be conventional in design, exemplary demodulator-amplifier circuits suitable for association with the circuits disclosed in detail herein being represented in the above-noted copending application. Preferably, the arrangement comprising tube 18 and its associated elements in Fig. 2 of the drawings of my copending application on a Dual Channel Receiver, Serial No. 443,212, filed July 14, 1954, may be employed. In any case, there should be applied to lead 14 an audio-frequency signal, with the radio-frequency components removed.

If the equipment detailed in the disclosed drawings is to be remotely controlled over a metallic circuit, then only the audio-frequency signal need be transmitted and no demodulation is required, in which case the antenna 10 may be omitted and the contents of rectangle 12 may be totally omitted or may merely constitute an audio-frequency amplifier.

In either case, the audio frequency signal appearing on conductor 14 is applied through coupling capacitor C1 and to ground through resistor R1 to apply an input voltage to the control grid of vacuum tube V1, which may be a tetrode or pentode, for example.

Operating voltages are applied to vacuum tube V1, and to other elements in the circuit, by means of a conventional voltage-doubling power supply including transformer T1, which may be merely an isolation transformer having a 1:1 turns ratio, diodes D1 and D2, which may be of the dry disc type, and capacitors C2 and C3. The lower terminal of capacitor C3 is grounded and the total voltage across both capacitors C2 and C3, between conductor 16 and ground, is approximately twice that existing across capacitor C3 alone, between conductor 18 and ground.

The direct voltage on conductor 16 is applied through resistor R2 to the screen grid of vacuum tube V1, that grid being effectively grounded from an alternating-current standpoint by capacitor C4, and the voltage on conductor 16 is also applied through load resistor R3 to the anode of tube V1. The cathode of tube V1 is grounded through biasing resistor R4, which is bypassed, to prevent degenerative feedback, by capacitor C5.

The resultant amplified audio-frequency voltage appearing across load resistor R3 (the voltage appearing between the anode of tube V1 and conductor 16, which is effectively at alternating-current ground level due to the size of capacitors C2 and C3) is applied across a group of serially interconnected elements including coupling capacitor C6, network 20 and capacitor C7. Capacitors C6 and C7 are sufficiently large so that their capacitative reactance is low for the frequencies employed. Consequently, conductor 22, connected to the upper terminal of capacitor C7, is effectively at alternating-current ground level, and substantially the entire alternating voltage appearing across load resistor R3 appears across network 20.

Network 20 is shown to comprise a resistor R5 serially connected to a parallel resonant circuit 21 comprising capacitor C8 and inductor I1. The parameters of this tuned circuit are so varied or selected for each receiver that the circuit is resonant at the frequency to which the receiver is to be responsive, and the "Q" of that tuned circuit is selected in the light of the spacing between adjacent frequencies among the plurality of discrete frequencies which are employed to actuate the plurality of receivers of the type disclosed.

Network 20, in view of the above described interconnections, may be considered to act as an alternating-voltage divider. Since tuned circuit 21 is resonant at the selected frequency, its impedance will approach a limit value at that selected frequency, and since tuned circuit 21 is shown to be a parallel tuned circuit, that limit value will be a maximum. Hence, the alternating voltage appearing across capacitor C8 and inductor I1 will be at a maximum, for an assumed constant-amplitude input signal, at the selected frequency. The variation in amplitude of the alternating voltage appearing across tuned circuit 21 with constant-amplitude input signals of various frequencies is represented in Fig. 2A. As shown, the peak-to-peak amplitude is greater at the selected frequency FS than it is at any lower frequency F1 or any higher frequency F2. It will be recognized that the representation of the alternating voltage wave form per se in Fig. 2A (as well as in Figs. 2B and 2D) is but approximate, there being no correlation between the physical space occupied by any shown cycle and frequency.

Ignoring the minor voltage drops across capacitors C6 and C7, the voltage appearing across resistor R5 will be effectively equal to the alternating voltage across resistor R3 less the aforesaid alternating voltage across tuned circuit 21. Therefore, although resistor R5 per se is not frequency sensitive, the alternating voltage thereacross, under the shown connections and assuming a constant input-voltage amplitude, will also vary with frequency, approaching a limit value at the selected frequency, the limit value being a minimum in this case. This frequency-versus-amplitude relationship is represented in Fig. 2B of the drawings.

It will be observed at this point that for any given frequency of input signal, the relationship of the voltage appearing across resistor R5 to the voltage appearing across the tuned circuit 21 is constant regardless of variations in the amplitude of the input signal. As will be seen, the equipment is adapted to function in response to the relative amplitudes of the voltages across resistor R5 and across the tuned network 21 so that, at least within the amplitude variations met in practice, the system is effectively insensitive to variations in the absolute amplitude of the input signal.

The alternating voltage appearing across resistor R5 is rectified by means of diode V2A. While diode V2A is shown to be of the vacuum-tube type, sharing an envelope with diode V2B, it will be recognized that other types of rectifying devices, such as semi-conductors, may be employed.

Resistor R5 is effectively connected in series with diode V2A and with the parallel network comprising load resistor R6 and filter capacitor C9. The resultant half-wave rectification will produce a direct voltage across resistor R6 and capacitor C9 the amplitude of which is a function of the amplitude of the alternating voltage appearing across resistor R5 and the polarity of which is such that the voltage on conductor 24, connected to the upper ends of resistor R6 and capacitor C9, is negative relative to the voltage appearing on conductor 26, connected to the lower ends of resistor R6 and capacitor C9. This direct voltage between conductors 24 and 26, resulting from rectification of the alternating voltage represented in Fig. 2B, is represented in Fig. 2C. Since conductor 22 is at a substantial positive direct voltage relative to ground as will be noted hereinafter, the direct-voltage level of both conductors 24 and 26 is substantially positive, but the effect of the rectification of the alternating voltage across resistor R5 is to make the direct voltage on conductor 24 less positive than the direct voltage on conductor 26.

This voltage appearing between conductors 24 and 26 is employed to bias a second rectifying element V2B. Under static, no-signal conditions, the anode and cathode of diode V2B are effectively at the same direct voltage, both being at the potential of conductor 22 since the cathode of diode V2B is connected thereto through resistor R10 and since the anode of diode V2B is connected thereto by inductor I1 and resistor R6. The effect of the rectification of the alternating voltage appearing across resistor R5 is therefor to make the anode of tube V2B, connected to conductor 24, negative relative to the cathode of that tube by an amount effectively equal to the direct voltage appearing across resistor R6, that is, by an amount effectively equal to the direct-voltage difference between conductors 24 and 26. As a result, diode V2B is biased in its non-conductive direction and cannot effectively conduct unless the voltage level at its anode is raised, relative to its cathode, by an amount in excess of the voltage drop across resistor R6. The amount of the voltage drop across resistor R6 will vary, as aforesaid, both with the frequency of the incoming signal and with the amplitude of the incoming signal, under the circuit connections shown.

Tuned circuit 21 is serially connected with resistor R6, which is shunted by capacitor C9, with diode V2B, and with resistor R10, which is shunted by filter capacitor C11. Therefore, when an input signal is being received, an alternating voltage is applied across diode V2B, the amplitude of which is a direct function of amplitude of the alternating voltage appearing across network 21. As long as diode V2B is perfectly non-conducting, this alternating voltage across diode V2B is effectively equal to the alternating voltage across tuned circuit 21. Consequently, during one half of each cycle, the anode of diode V2B is driven positive relative to its cathode, from an alternating-current standpoint, by an amount determined both by the amplitude and the frequency of the input signal. The parameters are so selected that the sum of the aforesaid direct-voltage drop across resistor R6 and the instantaneous positive peak values of the alternating voltage is positive, to render diode V2B conductive, only in the range of the selected frequency, and such that the amplitude of the rectified current is sufficient to produce a preselected critical voltage drop across resistor R10 only in the immediate region of the selected frequency. The algebraic sum of the direct and alternating voltages represented in Figs. 2C and 2A, respectively, is shown in Fig. 2D, and the positive portion of that composite curve, during which the anode of diode V2B is positive relative to the cathode, is cross-hatched. It will again be noted that the zero axis is not ground.

It will be observed that resistor R5 and tuned circuit 21 cooperate to render amplitude variations of the input signal insignificant and that they further cooperate to produce the aforesaid preselected critical voltage drop across resistor R10 at the selected frequency since the negative bias voltage on diode V2B produced by the voltage drop across resistor R5 approaches a limit value, which is a minimum, at the selected frequency and since the alternating voltage across tuned circuit 21 approaches a limit value, which is a maximum, at the selected frequency.

The critical amplitude of the voltage drop across resistor R10, produced by rectification of the positive peaks of the alternating voltage appearing across tuned circuit 21, is determined by the characteristics of the output circuit including power tube V3. Triode V3, in the absence of an input signal in the range of the selected frequency, is preferably biased to, or substantially to, grid cut-off. Thus, a voltage dividing network comprising resistors R14 and R16 is connected between conductor 18 and ground, so that conductor 22 is at a positive direct voltage level lower than that of conductor 18 by an amount equal to the voltage drop across resistor R14. This voltage difference is applied as a negative bias to tube V3, the cathode of that tube being connected to conductor 18 and the control grid of that tube being connected to conductor 22 through resistor R10. The anode of triode V3 is connected to the more positive direct voltage on conductor 16 through current-limiting resistor R18 and through the winding of relay 28, which is shunted by time-delay capacitor C13. At any time that a signal of the selected frequency is not being received, tube V3 is so biased that the current therethrough and through the winding of the relay 28 is insufficient to operate that relay. In the immediate region of the selected frequency, however, the voltage drop across resistor R10 reaches the aforesaid preselected critical value, with the upper end of resistor R10 being positive relative to the lower, to overcome the negative bias produced by the voltage drop across resistor R14, thereby sufficiently to increase the plate current of tube V3 to operate relay 28. Relay 28 closes its contacts to control an external load device, not shown. When the input signal is of a frequency other than the selected frequency, the voltage drop across resistor R10 will be insufficient to adequately overcome the bias on tube V3 so that relay 28 will not be operated.

Obviously, when the received signal of the selected frequency terminates, the plate current of tube V3 will again be reduced to release relay 28 when capacitor C13 has adequately discharged through the winding thereof.

The voltage appearing across resistor R10 resulting from rectification of the positive peaks of the alternating voltage represented in Fig. 2D is represented in Fig. 2E, and the algebraic sum of this voltage and of the negative bias voltage applied to tube V3 is represented in Fig. 2F.

It will be understood that in this application, the term "limit value" is employed in its usual sense as connoting either maximum or minimum conditions, and thus as describing the amplitude of a voltage when it reaches its most positive or its least positive or its most negative or its least negative value.

While it will be apparent that the embodiment of the invention herein disclosed is well calculated to fulfill the object above stated, it will be appreciated that the invention is susceptible to modification, variation and change without departing from the proper scope or fair meaning of the subjoined claims.

What is claimed is:

1. In a signal-frequency-sensitive control system adapted to receive alternating-current signals of a plurality of frequencies in the audio-frequency range including a selected frequency, means for producing a direct voltage signal the magnitude of which varies with the frequency of the received alternating current signal comprising a reactive network and a resistive network responsive to said signals, said reactive network being resonant at said selected frequency and comprising an inductance and a capacitance, a load resistor, a first rectifying element controlled by said reactive network for developing a direct voltage across said load resistor, and means including a second rectifying element controlled by said resistive network for establishing a controlling bias on said first rectifying element.

2. In a signal-frequency-sensitive control system adapted to receive alternating-current signals of a plurality of frequencies in the audio-frequency range including a selected frequency, means for producing a direct voltage signal the magnitude of which varies with the frequency of the received alternating current signal comprising a reactive network and a resistive network responsive to said signals, said reactive network being resonant at said selected frequency and comprising an inductance and a capacitance, a load resistor, a first rectifying element, means including said reactive network for applying across said first rectifying element an alternating voltage the amplitude of which is a function of the frequency of said signals, and means including a second rectifying element and said resistive network for applying across said first rectifying element a direct voltage of such polarity as to tend to prevent conduction through said first rectifying element, said first rectifier being responsive to the instantaneous algebraic sum of said voltages for developing across said load resistor a direct voltage of a preselected critical amplitude only when said signal is of said selected frequency.

3. In a signal-frequency-sensitive control system adapted to receive alternating-current signals of a plurality of frequencies in the audio-frequency range including a selected frequency, means for producing a direct voltage signal the magnitude of which varies with the frequency of the received alternating current signal comprising a reactive network and a resistive network responsive to said signals, said reactive network being resonant at said selected frequency and comprising an inductance and a capacitance, a load resistor, a first rectifying element, means including said reactive network for applying across said first rectifying element an alternating voltage the amplitude of which is a function of the frequency of said signals, means including a second rectifying element and said resistive network for applying across said first rectifying element a direct voltage of such polarity as to tend to prevent conduction through said first rectifying element, the amplitude of said direct voltage being a function of the frequency of said signals, said first rectifier being responsive to the instantaneous algebraic sum of said voltages for developing across said load resistor a direct voltage of a preselected critical amplitude only when said signal is of said selected frequency.

4. In a signal-frequency-sensitive control system adapted to receive alternating-current signals of a plurality of frequencies in the audio-frequency range including a selected frequency, means for producing a direct voltage signal the magnitude of which varies with the frequency of the received alternating current signal comprising a reactive network and a resistive network responsive to said signals, said reactive network being resonant at said selected frequency and comprising an inductance and a capacitance, a load resistor, a first rectifying element, means including said reactive network for applying across said first rectifying element an alternating voltage the amplitude of which is a function of the frequency of said signals and a function of the amplitude of said signals, and means including a second rectifying element and said resistive network for applying across said first rectifying element a direct voltage of such polarity as to tend to prevent conduction through said first rectifying element, the amplitude of said direct voltage being a function of the amplitude of said signals, said first rectifier being responsive to the instantaneous algebraic sum of said voltages for developing across said load resistor a direct voltage of a preselected critical amplitude only when said signal is of said selected frequency.

5. In a signal-frequency-sensitive control system adapted to receive alternating-current signals of a plurality of frequencies in the audio-frequency range including a selected frequency, means for producing a direct voltage signal the magnitude of which varies with the frequency of the received alternating current signal comprising a reactive network and a resistive network responsive to said signals, said reactive network being resonant at said selected frequency and comprising an inductance and a capacitance, a load resistor, a first rectifying element, means including said reactive network for applying across said first rectifying element an alternating voltage the amplitude of which is a function of the frequency of said signals and a function of the amplitude of said signals, and means including a second rectifying element and said resistive network for applying across said first rectifying element a direct voltage of such polarity as to tend to prevent conduction through said first rectifying element, the amplitude of said direct voltage being a function of the frequency and of the amplitude of said signals, said first rectifier being responsive to the instantaneous algebraic sum of said voltages for developing across said load resistor a direct voltage of a preselected critical amplitude only when said signal is of said selected frequency.

6. In a signal-frequency-sensitive control system, a source of alternating-current signals of a plurality of frequencies including a selected frequency, and means for producing a direct voltage signal the magnitude of which varies with the frequency of the received alternating-current signal comprising a parallel resonant network tuned to said selected frequency, a resistor connected in series with said network across said source, a first series circuit comprising said resistor, a first rectifying element and a first load resistor, a second series circuit comprising said resonant network, said first load resistor, a second rectifying element and a second load resistor, and output means responsive to the voltage across said second load resistor.

7. In a signal-frequency-sensitive control system, a source of alternating-current signals of a plurality of frequencies including a selected frequency, and means for producing a direct voltage signal the magnitude of which varies with the frequency of the received alternating-current signal comprising a parallel resonant network tuned to said selected frequency, a resistor connected in series with said network across said source, a first series circuit comprising said resistor, a first rectifying element and a first load resistor, a second series circuit comprising said resonant network, said first load resistor, a second rectifying element and a second load resistor, and output means responsive to the voltage across said second load resistor, said first rectifying element being connected to develop across said first load resistor a direct voltage of a polarity tending to prevent conduction through said second rectifying element.

8. In a signal-frequency-sensitive control system adapted to receive alternating-current input signals of a plurality of frequencies in the audio-frequency range including a selected frequency, means for producing a direct voltage signal the magnitude of which varies with the frequency of the received alternating current signal comprising output means comprising a load resistor and a rectifying element serially connected to said load resistor, means including another rectifying element for applying across said output means a direct voltage the amplitude of which varies as a function of the amplitude of said input signals, and means including a resonant network tuned to said selected frequency for applying across said output means an alternating current signal having an amplitude which varies as a function of the amplitude of said input signals and which approaches a limit value when said input signal is of said selected frequency.

9. In a signal-frequency-sensitive control system adapted to receive alternating-current input signals of a plurality of frequencies in the audio-frequency range including a selected frequency, means for producing a direct voltage signal the magnitude of which varies with the frequency of the received alternating current signal comprising output means comprising a load resistor and a rectifying element serially connected to said load resistor, means including another rectifying element for applying across said output means a direct voltage the amplitude of which varies as a function of the frequency of said input signals, and means including a resonant network tuned to said selected frequency for applying across said output means an alternating-voltage signal having an amplitude which approaches a limit value when said input signal is of said selected frequency.

10. In a signal-frequency-sensitive control system adapted to receive alternating-current input signals of a plurality of frequencies in the audio-frequency range including a selected frequency, means for producing a direct voltage signal the magnitude of which varies with the frequency of the received alternating current signal comprising output means comprising a load resistor and a rectifying element serially connected to said load resistor, means including another rectitfying element for applying across said output means a direct voltage the amplitude of which varies as a function of the frequency and of the amplitude of said input signals, and means including a resonant network tuned to said selected frequency for applying across said output means an alternating-voltage signal having an amplitude which varies as a function of the amplitude of said input signals and which approaches a limit value when said input signal is of said selected frequency.

References Cited in the file of this patent

UNITED STATES PATENTS

| | | |
|---|---|---|
| 2,194,559 | Koch | Mar. 26, 1940 |
| 2,457,730 | Roberts | Dec. 28, 1948 |
| 2,519,029 | Dome | Aug. 15, 1950 |
| 2,538,150 | Farbham | Jan. 16, 1951 |
| 2,554,329 | Hammond | May 22, 1951 |
| 2,638,540 | Toth | May 12, 1953 |
| 2,730,615 | Mantz | Jan. 10, 1956 |